United States Patent Office

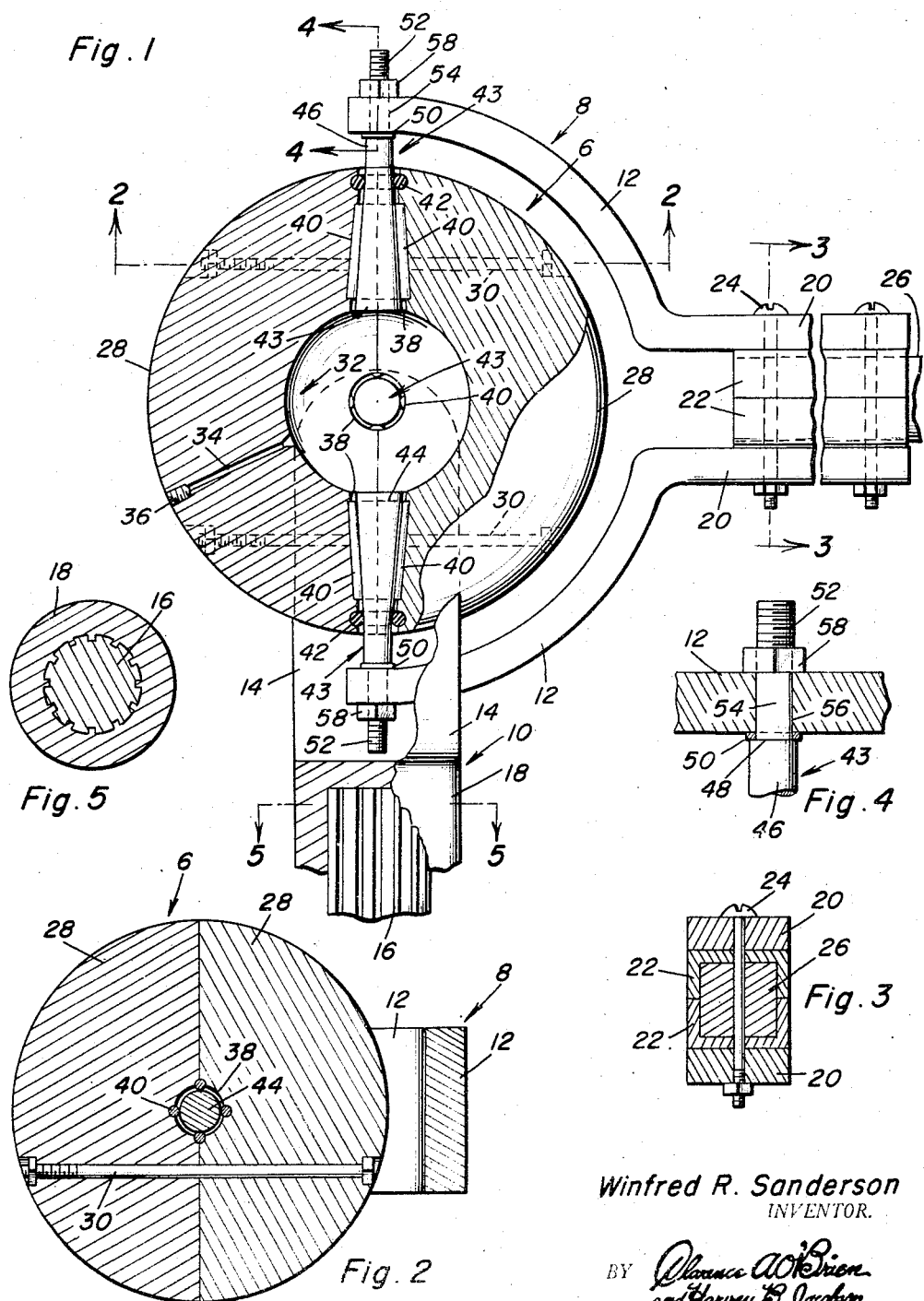

2,833,130
Patented May 6, 1958

2,833,130

UNIVERSAL JOINT

Winfred R. Sanderson, Vardaman, Miss.

Application October 12, 1955, Serial No. 539,979

2 Claims. (Cl. 64—17)

The present invention relates to an improved universal joint in which shaft sections or equivalent mechanical elements are joined together for adaptable operation by way of a novel universal joint characterized by a ball, individual but cooperating yokes to which said shaft sections are connected, and a novel arrangement of bearings and trunnions carried by the yokes and functioning properly in their respective bearings.

An object of the invention is to provide a hollow-center sectional ball wherein the latter has bearings constantly in communication at their inward ends with the hollow-center and said hollow-center being charged with a lubricant so that the trunnions, which are journaled in the bearings, are constantly and effectively lubricated by way of the lubricant in said hollow-center.

More specifically, novelty is predicated on bearings in the stated chambered or hollow-centered ball wherein the bearings are communicable at their inner ends with the hollow-center and have their outer ends extending through the periphery or surface of the ball, said bearings being tapered and the trunnions, which are fitted therein, being correspondingly tapered, and said bearings being further provided with circumferentially spaced roller bearings which effect a highly efficient cooperation between the trunnions, roller bearings and bearings proper in which the trunnions are mounted.

Finally, novelty is predicated on a simplified connection between one end of the trunnion and the adjacent cooperating end of the fork arm wherein said fork arm has a square or equivalent hole therethrough and the cooperating shank of the trunnion is correspondingly square and is removably fitted in the hole and held handily in place by a simple screw-threaded stud and nut arrangement.

Other objects, features and advantages will become more readily apparent from the following description and the accompanying sheet of illustrative drawings.

In the drawings, wherein like numerals are employed to designate like parts throughout the views:

Figure 1 is a view in section and elevation illustrating a universal joint constructed in accordance with the principles of this invention;

Figure 2 is a section on the line 2—2 of Figure 1 looking in the direction of the arrows; and Figures 3, 4, and 5 are sections taken on the planes of the lines 3—3, 4—4 and 5—5, respectively, of Figure 1.

Referring to the essential components the spherical coupling member is here referred to as a ball and is denoted by the numeral 6. One yoke is denoted at 8 and the other yoke at 10. The first yoke having arcuate arms 12 and the second yoke having similarly constructed arcuate arms 14, the arms of the respective yokes being at approximate right angles to one another. One shaft section has a splined end 16 keyed to the body portion 18 of the yoke 10 as shown in Fig. 1. The yoke arms 12 are provided with spaced parallel linearly straight extensions 20 which form a shank and which is spaced apart and have a pair of cooperating channel-shaped members 22 fitted therebetween and forming a sort of a sleeve. This sleeve is non-circular in cross-section and the parts 22 are bolted thereto as at 24. The same bolts serve to attach the shaft section 26 in the sleeve and the several parts to the extensions or shank members 20. Thus, and as is more or less common in this line of endeavor, the structure so far set forth in detail has to do with a junctional or coupling ball, a pair of properly inter-related yokes with their arms suitably embracing surface portions of the ball and with the yokes carrying the respective shaft sections. The novelty is, of course, in the specific construction of the ball 6 and trunnions and bearings which provide the desired lubricated connections between the intended parts.

The ball is made up of semi-spherical sections 28 which are secured together by bolts 30 as shown in Fig. 2. At its center the ball has a spherical chamber or so-called hollow-center 32 which is intended to be charged or filled with a suitable lubricant. As seen in Fig. 1, the filler passage is denoted at 34 and at the outer end of this there is an Alemite or equivalent fitting 36 to charge the chamber with the stated lubricant. The fork arms of the respective forks 8 and 10 are all of the same construction. So are the trunnions which serve to connect the arms to the ball sections. As a matter of fact, the ball as an entity is provided with pairs of diametrically opposite tapered passages 38 which have appropriate grooves intermediate their ends to accommodate circumferentially spaced roller bearings 40. The bearings are really passages which open at their inner ends into the hollow-center 32 and have their outer ends opening through the surface of the ball. At the restricted outer end there is an appropriate gasket or packing ring 42. This roller-lined bearing or passage serves to accommodate a tapered bolt which is here treated as a trunnion or journal 43. The tapered portion is at 44 and is properly fitted in the outer shank portion. The outer shank portion 46 has a shoulder at 48 (see Fig. 4) to accommodate a washer or shim 50 and beyond this there is a cylindrical screw-threaded terminal portion 52 and in between there is a polygonal shank 54. This fits into a correspondingly shaped hole 56 in the yoke arm in the manner shown with with the parts assembled and held by the accessible nut 58. Each yoke arm is constructed as here shown and described and, of course, each bearing and trunnion arrangement is the same as in evident from Fig. 1.

This construction provides for quick applicable and removable as well as replaceable journaling bolts or trunnions 43. These function in a unique manner in conjunction with the correspondingly tapered bearings 38 and their cooperating roller bearings 40. It is felt therefore that a jointing or coupling ball having these characteristics and especially the trunnion arrangement constitutes not only a novel contribution to the art but a significant advance in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A universal joint comprising a sectional ball provided with a hollow-center providing a grease-containing pocket and further provided with means for supplying grease from the exterior of the ball into said pocket, said ball being provided with two pairs of diametrically opposite and aligned bolt passages, each passage being tapered and provided intermediate its ends with roller bearings with the larger end of the taper inwardly and communicating with said hollow center, a tapered bolt removably and rotatably mounted in each tapered passage, said bolt having an outer end portion extending beyond the adjacent surface of the ball and provided with a screw-threaded terminal, a shoulder, and a polygonal portion between the shoulder and screw-threaded terminal; and shaft-equipped yokes, each yoke embodying arms straddling intended surface portions of said ball, the terminal end of each arm having a square bolt hole through which the square portion of the bolt extends in the manner and for the purposes described.

2. A universal joint comprising a jointing and coupling member having a hollow center for reception and retention of a lubricant, a lubricant injecting passage, a closure for the outer end of the passage, said passage communicating at its inner end with said hollow-center, said member being provided with at least one pair of diametrically opposite additional passages communicatively opening at their inner ends into said hollow-center and having their outer ends opening through the cooperating surface portions of said member, said additional passages defining bearings and being provided intermediate their respective inner and outer ends with circumferentially spaced roller bearings, a trunnion removably and rotatably mounted in each bearing and having an outer end extending beyond the surface of said member, a shaft, a yoke, said shaft being operatively connected with said yoke and said yoke embodying arms straddling cooperating surface portions of said member and the said arms having their respective free end portions operatively connected to the respective outer ends of said trunnions, each trunnion comprising a bolt having a tapered body portion and the bearing in which said body portion is located being correspondingly tapered, the outer end of said bolt being screw-threaded, shouldered and provided with an assembling nut, that portion of the bolt between the threaded end and shoulder being square in cross-section, the cooperating end portion of the yoke arm having a square hole into and through which the square portion of said bolt is extended, and a nut on the threaded end serving to detachably connect the bolt with the cooperating yoke arm.

References Cited in the file of this patent

UNITED STATES PATENTS

| | | |
|---|---|---|
| 1,826,611 | Furgason | Oct. 6, 1931 |
| 1,918,613 | Peters | July 18, 1933 |
| 2,024,777 | Neumann | Dec. 17, 1935 |

FOREIGN PATENTS

| | | |
|---|---|---|
| 798,315 | France | Mar. 2, 1936 |